UNITED STATES PATENT OFFICE.

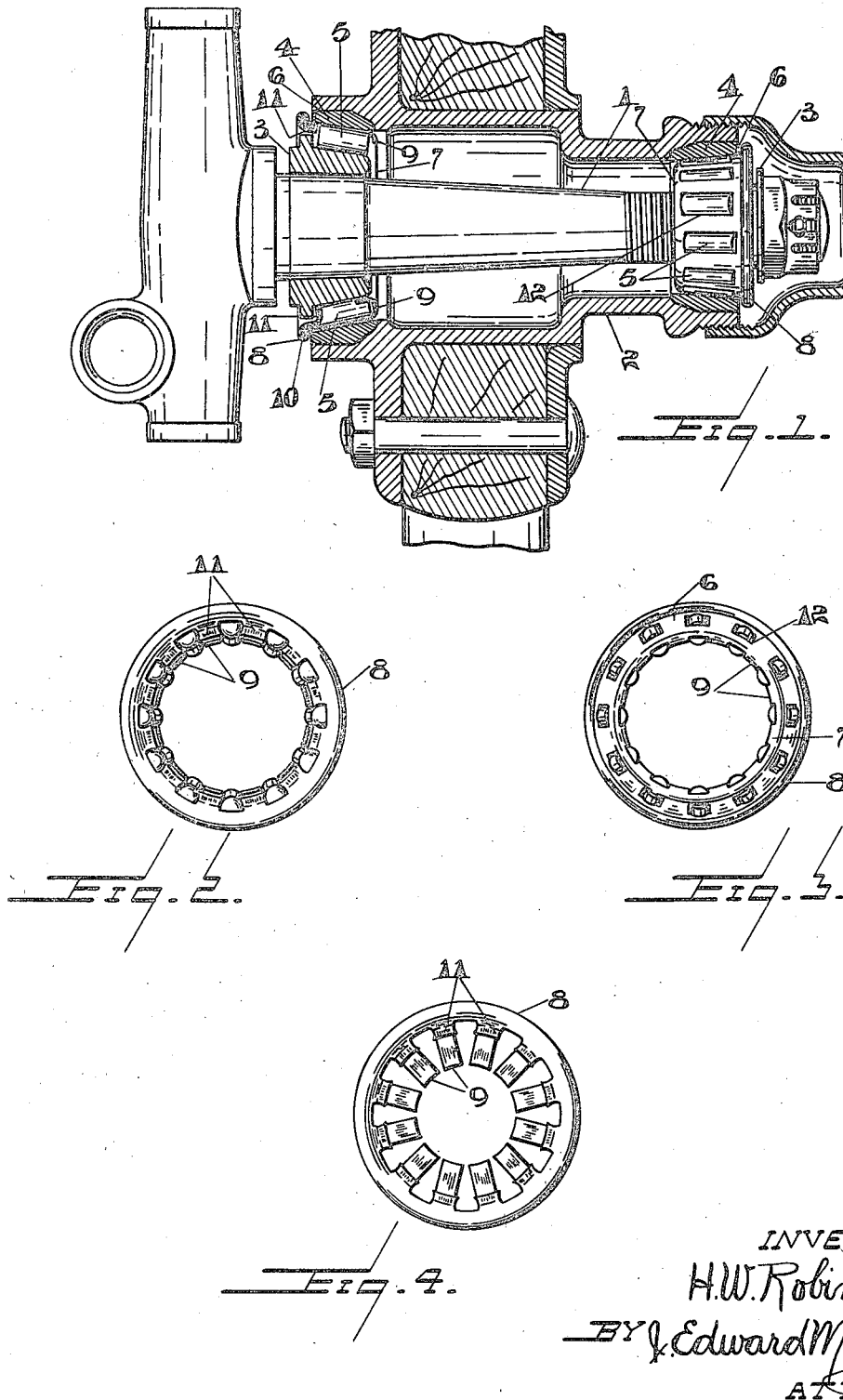

HARRY WALTER ROBINSON, OF TORONTO, ONTARIO, CANADA, ASSIGNOR TO THE CHAPMAN DOUBLE BALL BEARING COMPANY OF CANADA, LIMITED, OF TORONTO, ONTARIO, CANADA.

ROLLER-BEARING.

1,383,758.  Specification of Letters Patent.  Patented July 5, 1921.

Application filed May 26, 1919. Serial No. 299,771.

*To all whom it may concern:*

Be it known that I, HARRY W. ROBINSON, of the city of Toronto, in the county of York, Province of Ontario, Canada, have invented certain new and useful Improvements in Roller-Bearings, of which the following is a specification.

This invention relates to roller bearings particularly adapted for axle bearings for motor vehicles, and my object is to devise a cheap, simple and easily made cage for such bearings which will properly retain the rollers in place, which will be entirely independent of the cup or cone employed in the bearing, and which, when separated from the other parts, will hold the rollers in their relative positions.

I attain my object by means of the constructions hereinafter described and illustrated in the accompanying drawings in which—

Figure 1 is a longitudinal section of the cage in position in a bearing, two rollers being shown;

Fig. 2 an elevation of one end;

Fig. 3 an elevation of the other end; and

Fig. 4 a cross section showing the two parts of the cage as they appear before being connected and with the roller retaining tongues in the position they occupy before the rollers are inserted.

In the drawings like numerals of reference indicate corresponding parts in the different figures.

In Fig. 1, 1 is a spindle and 2 a hub or casing journaled on the spindle by means of roller bearings, each of which comprises the usual cone 3, hub 4, and rollers 5 held in place by a cage. This cage is of drum shape, being formed with a periphery 6 and ring-shaped ends 7 and 8. The end 7 is integral with the periphery 6 and has a series of fingers 9 formed thereon which initially extend radially inwardly as shown in Fig. 4. The periphery 6 has slots 12 formed therein to permit of the rollers 5 partly projecting therethrough.

The ring-shaped end 8 is formed as a separate piece secured to the periphery of the drum. In the preferable arrangement, the periphery of the drum is formed with an outwardly directed flange 10 over which the end 8 is folded or seamed as shown. The end 8 is formed with a series of fingers 11 which in the first place extend radially inwardly as shown in Fig. 4.

The end 8 having been secured to the flange 10 of the periphery 6 of the drum as hereinbefore described, the rollers 5 are placed in position. The fingers 9 are then turned inwardly so that they extend approximately in a direction parallel to the axes of the rollers which they are designed to hold in place. These fingers being of greater width than the spaces between the rollers and being located in a circle intermediate the imaginary circle in which the axes of the rollers lie and the imaginary circle touched by the rollers at their inner sides, the rollers are held in place in the cage independently of any contact with the cup or cone with which the cage with its rollers is employed.

The fingers 11 are bent inwardly and then radially and the sides of their ends are curved to fit between the curved surfaces of the rollers to prevent inward displacement of the rollers. The slots 12 being of less width than the greatest diameter of the rollers, the latter cannot escape outwardly through these slots.

In case of any damage to any one or more rollers, the cage with its set of rollers is thus easily removed without disturbing the cup or cone of the bearing, and a new cage with a new set of rollers substituted, or new rollers substituted for any that may be damaged.

What I claim as my invention is:—

1. A roller bearing cage of drum form having slots in its periphery through which the rollers may partly project and having ring shaped ends, one of said ends provided with integral inwardly projecting fingers extending between the rollers and the opposite end having an outwardly directed flange; and a ring plate folded over and connected to said flange and provided with fingers adapted for engagement with the surfaces of said rollers.

2. A roller bearing cage of drum form having slots in its periphery through which the rollers partly project and having ring shaped ends, one of said ends provided with integral inwardly projecting fingers extending between the rollers; and a ring plate connected to the opposite end of said drum and provided with fingers extending first axially, then radially inward and are curved to engage the curved roller surfaces.

3. A process of forming a cage for a roller bearing which consists in stamping out of sheet metal, a drum in the form of an axially slotted conic frustum, having an outwardly directed flange at one end and a ring at the opposite end, forming the ring with integral fingers extending radially therefrom and bending over the flanged end of the drum a ring plate stamped out of sheet metal to form inwardly extending radial fingers.

Signed at Toronto this 14th day of May A. D. 1919.

HARRY WALTER ROBINSON.